US011763016B2

(12) United States Patent
Blass et al.

(10) Patent No.: US 11,763,016 B2
(45) Date of Patent: Sep. 19, 2023

(54) SYSTEMS AND METHODS FOR DETECTING EXPOSED DATA

(71) Applicant: Walmart Apollo, LLC, Bentonville, AR (US)

(72) Inventors: Oscar J. Blass, Bentonville, AR (US); Joshua Gimer, Colorado Springs, CO (US)

(73) Assignee: WALMART APOLLO, LLC, Bentonville, AR (US)

( * ) Notice: Subject to any disclaimer, the term of this patent is extended or adjusted under 35 U.S.C. 154(b) by 408 days.

(21) Appl. No.: 17/068,329

(22) Filed: Oct. 12, 2020

(65) Prior Publication Data

US 2021/0081558 A1 Mar. 18, 2021

Related U.S. Application Data

(63) Continuation of application No. 16/459,759, filed on Jul. 2, 2019, now Pat. No. 10,846,422.

(Continued)

(51) Int. Cl.
*G06F 16/00* (2019.01)
*G06F 21/62* (2013.01)
(Continued)

(52) U.S. Cl.
CPC ........ *G06F 21/6218* (2013.01); *G06F 16/248* (2019.01); *G06F 16/2465* (2019.01); *G06F 16/285* (2019.01); *G06F 21/10* (2013.01)

(58) Field of Classification Search
None
See application file for complete search history.

(56) References Cited

U.S. PATENT DOCUMENTS 7,516,492 B1  4/2009 Nisbet
7,996,373 B1  8/2011 Zoppas
(Continued)

OTHER PUBLICATIONS

Gessiou, Eleni, Quang Hieu Vu, and Sotiris Ioannidis. "Irild: An information retrieval based method for information leak detection." 2011 Seventh European Conference on Computer Network Defense. IEEE, 2011 (Year: 2011).

(Continued)

*Primary Examiner* — Thu Nguyet T Le
(74) *Attorney, Agent, or Firm* — Fitch, Even, Tabin & Flannery LLP

(57) ABSTRACT

In some embodiments, apparatuses and methods are provided herein useful to determining if sensitive data has been exposed externally. In some embodiments, a system for determining if sensitive data has been exposed externally comprises an external database including a plurality of external repositories, an internal database including a plurality of internal repositories, an internal catalog including search candidates, and a control circuit configured to transmit a content search query, receive content search results, transmit a hash search query, receive hash search results, discard, from the hash search results, ones of the external repositories that have not been modified, wherein the content search results and the remaining external repositories comprise a subject group of repositories, determine which repositories in the subject group of repositories includes an expression, calculate, for the repositories, a confidence score, generate, for the repositories, a notification based on the confidence score, and transmit the notification.

20 Claims, 3 Drawing Sheets

Related U.S. Application Data

(60) Provisional application No. 62/692,949, filed on Jul. 2, 2018.

(51) Int. Cl.
   *G06F 16/248* (2019.01)
   *G06F 16/2458* (2019.01)
   *G06F 16/28* (2019.01)
   *G06F 21/10* (2013.01)

(56) References Cited

U.S. PATENT DOCUMENTS

| | | |
|---|---|---|
| 8,495,384 B1 | 7/2013 | Deluccia |
| 8,800,031 B2 | 8/2014 | Cecil |
| 9,569,626 B1 | 2/2017 | Brisebois |
| 10,055,422 B1 | 8/2018 | Addaguduru |
| 10,360,023 B2 | 7/2019 | Cowan |
| 2006/0143459 A1 | 6/2006 | Villaron |
| 2007/0050777 A1 | 3/2007 | Hutchinson |
| 2008/0077570 A1 | 3/2008 | Tang |
| 2010/0010968 A1 | 1/2010 | Redlich |
| 2010/0212010 A1 | 8/2010 | Stringer |
| 2013/0304742 A1 | 11/2013 | Roman |
| 2016/0132694 A1 | 5/2016 | Dhoolia |
| 2017/0169045 A1 | 6/2017 | Barad |
| 2017/0177860 A1 | 6/2017 | Suarez |
| 2017/0235848 A1 | 8/2017 | Van Dusen |
| 2018/0019971 A1* | 1/2018 | Gula ............... H04L 63/0876 |
| 2018/0314856 A1 | 11/2018 | Wen |
| 2019/0007387 A1* | 1/2019 | Jin ............... G06F 16/951 |

OTHER PUBLICATIONS

PCT; App. No. PCT/US19/39211; International Search Report and Written Opinion dated Sep. 9, 2019.
Securosis, L. L. C. "Understanding and Selecting a Data Loss Prevention Solution." Securosis LLC, 2010. (Year: 2010).
USPTO; U.S. Appl. No. 16/459,759; Notice of Allowance dated Jul. 13, 2020, (pp. 1-9).
USPTO; U.S. Appl. No. 16/459,759; Office Action dated Jan. 16, 2020; (pp. 1-16).
USPTO; U.S. Appl. No. 16/459,759; Office Action dated Apr. 22, 2020, (pp. 1-16).

* cited by examiner

SYSTEMS AND METHODS FOR DETECTING EXPOSED DATA

CROSS-REFERENCE TO RELATED APPLICATION

This application is a continuation application of U.S. application Ser. No. 16/459,759, filed Jul. 2, 2019, which claims the benefit of U.S. Provisional Application No. 62/692,949, filed Jul. 2, 2018, which are all incorporated by reference in their entirety herein.

TECHNICAL FIELD

This invention relates generally to data security and, more particularly, searching for exposed sensitive data.

BACKGROUND

Most people and businesses have sensitive data stored on computers, such as personal information, passwords, computer code, payment information, etc. While people and businesses attempt to prevent this sensitive data from being exposed externally, inadvertent or malicious exposure can occur. For example, a person may copy and paste information into an email and inadvertently include his or her credit card information in the copied information. From a business perspective, a programmer may upload source code to a public database for later viewing/modification and fail to remove a hardcoded password from the source code. In addition to inadvertent exposures, malicious actors may intentionally publish sensitive data. Typically, determining that sensitive data is exposed requires a human actor to realize the sensitive data has been exposed and report such exposure. Unfortunately, it may take a significant period of time (e.g., weeks, months, and possibly years) before a human actor notices, and reports, the exposure. Consequently, a need exists for better systems and methods for detecting such exposures.

BRIEF DESCRIPTION OF THE DRAWINGS

Disclosed herein are embodiments of systems, apparatuses and methods pertaining to determining if sensitive data has been exposed externally. This description includes drawings, wherein.

Figure 1:
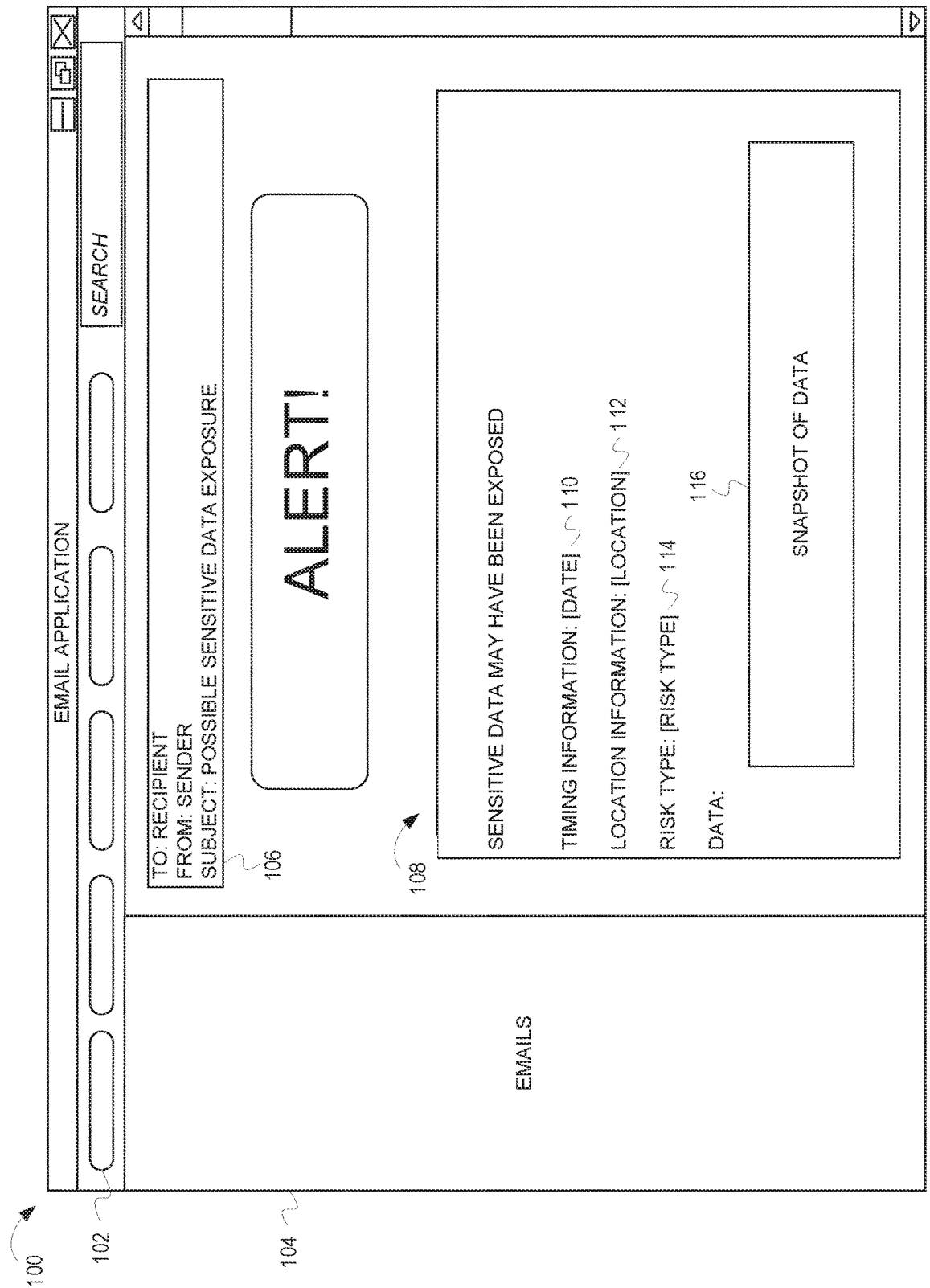
FIG. 1 depicts an example notification presented via an email application 100, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to determining if sensitive data has been exposed externally. In some embodiments, a system for determining if sensitive data has been exposed externally comprises an external database, wherein the external database includes a plurality of external repositories, wherein each of the external repositories is identified by a hash, an internal database, wherein the internal database includes a plurality of internal repositories, wherein each of the internal repositories is identified by a hash, an internal catalog, wherein the internal catalog includes search candidates, and a control circuit, wherein the control circuit is communicatively coupled to the external database, the internal database, and the internal catalog, the control circuit configured to transmit, to the external database, a content search query, wherein the content search query is based on the search candidates, receive, from the external database, content search results, wherein the content search results include ones of the plurality of external repositories that satisfy the content search query, transmit, to the external database, a hash search query, wherein the hash search query includes hashes associated with ones of the internal repositories, receive, from the external database, hash search results, wherein the hash search results include ones of the plurality of external repositories having hashes that match the hashes associated with ones of the plurality of internal repositories, discard, from the hash search results, any of the ones of the external repositories that have not been modified since last analyzed, wherein the content search results and the remaining external repositories comprise a subject group of repositories, determine, based on a list of expressions, which repositories in the subject group of repositories includes an expression from the list of expressions, calculate, for each repository of the subject group of repositories that include an expression from the list of expressions, a confidence score, generate, for each repository of the subject group of repositories that include an expression from the list of expressions, a notification, wherein a type of the notification is based on the confidence score, and transmit, based on the type of the notification, the notification.

As previously discussed, individuals and business store sensitive data on computers. Sensitive data can include any information associated with a person or entity which the person or entity does not want to be publicly available. For example, sensitive data can include payment information, passwords, keys, proprietary information, business data, etc. Oftentimes, sensitive data is exposed (e.g., accessible or viewable publicly) inadvertently (i.e., accidentally or unintentionally). One common cause of sensitive data exposure is employees publishing data to a source code management solution or other type of database so that the employees can continue working while away from the office. For example, a programmer may upload source code that he or she is working on to a database (e.g., GitHub) so that he or she can continue working on the source code at home. This becomes problematic if the source code includes sensitive data (e.g., hardcoded passwords). In addition to inadvertent exposure, malicious actors may expose sensitive data intentionally. In either case, the systems, methods, and apparatuses described herein can be used to determine if sensitive data has been exposed externally (e.g., publicly or to an audience, whether internal or external, that is not authorized or desired to be able to access the sensitive data).

The systems, methods, and apparatuses described herein are useful in determining whether sensitive data has been exposed externally. In some embodiments, the systems, methods, and apparatuses described herein search for exposed sensitive data in a two-pronged approach: 1) content included in external databases and 2) hashes associated with external repositories that match hashes associated with internal repositories. During the first prong, a search is performed based on the content of repositories included in an external database (i.e., external repositories). Repositories including any such content are further reviewed. During the second prong, hashes associated with internal repositories (i.e., repositories included in an internal database) are used to search the external database. If any of the hashes associated with the internal repositories are found in the external database, those external repositories can be reviewed further. Ultimately, notifications are transmitted when a repository is found that may include sensitive information. In some embodiments, the systems, methods, and apparatuses described herein can locate and identify sensitive data that has been exposed within hours. The discussion of FIG. 1 provides and overview of such systems, methods, and apparatuses.

FIG. 1 depicts an example notification presented via an email application 100, according to some embodiments. As previously discussed, if a repository (or other dataset) is found that may include sensitive data, a notification is generated and transmitted. The notification can be transmitted, and formatted for transmission, in any suitable form. For example, a notification can be transmitted via phone (e.g., an auditory notification), text message (e.g., SMS or MMS message), mail, or email. As depicted in FIG. 1, the notification is being transmitted as an email. The email is presented via the email application 100. The email application can include icons 102 (or other selectable features) and an email pane 104 in addition to the notification email. The notification email includes title information 106 (e.g., a recipient, a sender, a subject line, and any other suitable information). Additionally, the notification email includes sensitive data information 108. The sensitive data information 108 can include any desired information regarding the sensitive data and where it was found. For example, the sensitive data information depicted in FIG. 1 includes timing information 110 (e.g., when the sensitive data was found, when the sensitive data was exposed externally, etc.), location information 112 (e.g., where the sensitive data was found), and a risk type 114 (e.g., a confidence score indicating the likelihood that the sensitive data found is indeed sensitive data). In some embodiments, the sensitive data information can also include a snapshot 116 of the sensitive data (e.g., an image, description, etc. of the sensitive data).

In some embodiments, a type of the notification is based on the confidence score. The type of the notification can include a manner in which the notification is transmitted and/or a flagging system indicating (i.e., a system to flag repositories) a priority of a need to analyze the notification and/or sensitive data. The determination as to the type of the notification can be based on one or more thresholds. For example, a confidence score above a first threshold (i.e., exceeding the first threshold) may result in an email notification and a phone call notification. Additionally, the type of the notification may be immediate analysis (i.e., it is likely that sensitive data has been exposed and that an incident response team should analyze the sensitive data as soon as possible). If the confidence score is below the first threshold but above a second threshold, the notification may only be sent via email. Additionally, the notification type may be that of prioritized analysis (i.e., it is possible that sensitive data has been exposed and the sensitive data should be analyzed in a prioritized manner) and the sensitive data (e.g., repository associated with the sensitive data) is added to a queue for analysis. Finally, if the confidence score falls below the second threshold, the notification may only be that the sensitive data is marked as standard analysis and added to a queue (i.e., no email notification is sent). While this two-threshold example is provided for clarity, it should be noted that this is indeed only an example. Any suitable number of thresholds and types of notifications can be used.

Figure 2:
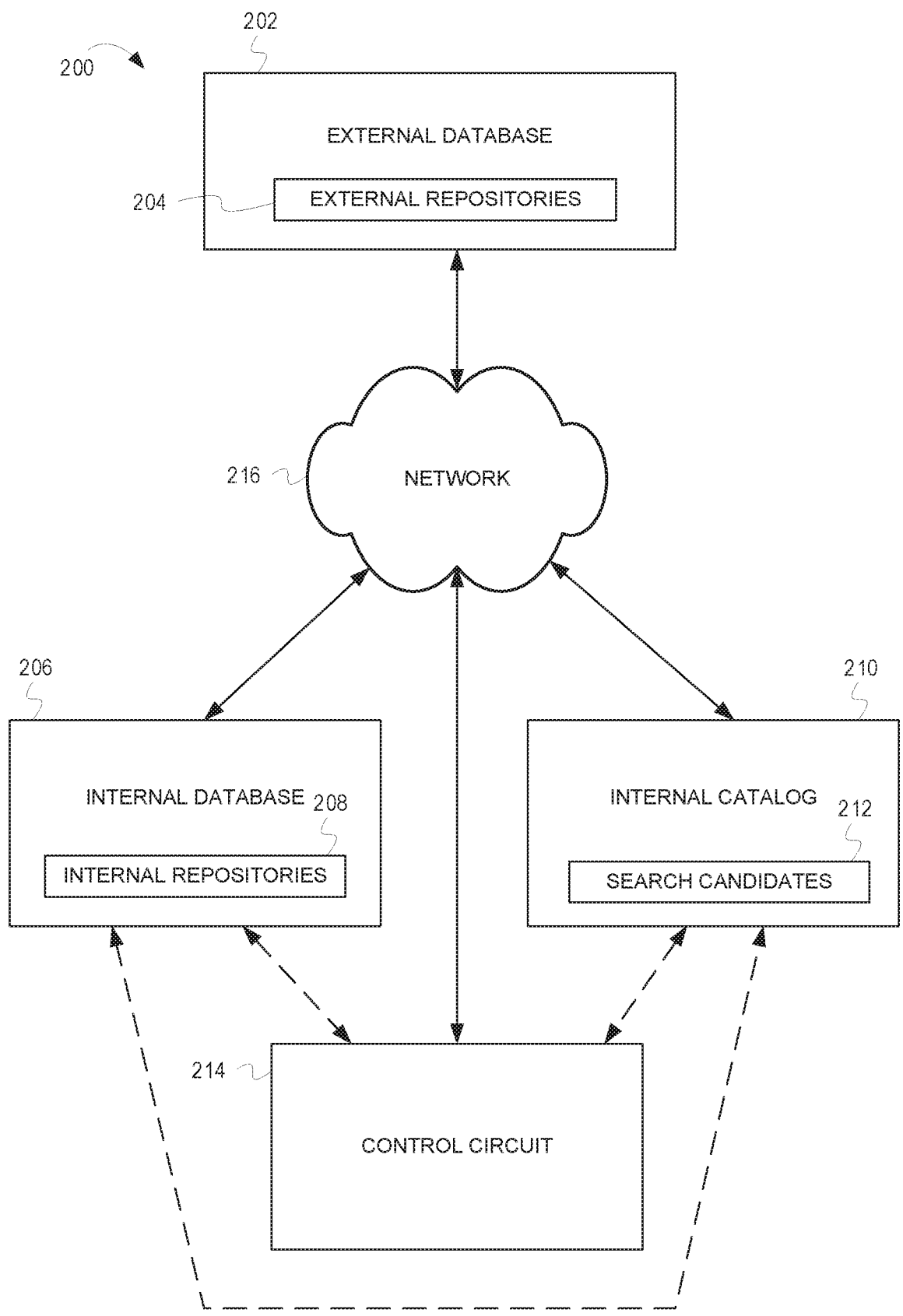
FIG. 2 is a block diagram of a system 200 for determining if sensitive data has been exposed externally.

While the discussion of FIG. 1 provides an overview of transmitting notifications associated with potentially exposed sensitive data, the discussion of FIG. 2 provides additional detail regarding a system for determining if sensitive data has been exposed externally.

FIG. 2 is a block diagram of a system 200 for determining if sensitive data has been exposed externally. The system 200 includes an external database 202, a network 216, an internal database 206, an internal catalog 210, and a control circuit 214. Although depicted as only single databases, the external database 202 and the internal database 206 can include multiple databases (e.g., hosted by a single entity or multiple entities). The control circuit 214 is communicatively coupled to the external database 202, the internal database 206, and the internal catalog 210. The control circuit 214 can be communicatively coupled to the external database 202, the internal database 206, and the internal catalog 210 via the network 216 (as depicted by the solid arrows) or directly (as depicted by the dashed arrows). The network 216 can be any suitable type of network and, in some embodiments, can include multiple sub-networks.

The external database 202 is "external" in that any sensitive data included in the external database 202 would be considered exposed. For example, the external database 202 can be third-party data storage that is publicly accessible or data storage that is accessible to members of a group not authorized to have access to the data. The external database 202 can be any type of electronic record that includes information. Consequently, the external database 202 can quite literally be a database, or any other type of electronic storage (e.g., a web server, a hard disk, a source control management provider, a source code management solution (e.g., GitHub), etc.), possibly including additional functionality such as search features, authentication services, user interfaces, etc. The external database 202 includes external repositories 204. The external repositories 204 are identified by hashes. The hashes are generated based on the content of the repository. Consequently, when the data included in a repository changes, the hash will also change. Additionally, because the hashes are based on the content of the repositories, it is uncommon for two repositories having different content to have identical hashes.

The internal database 206 is "internal" in that any sensitive data included in the internal database 206 would not be considered exposed. For example, the internal database 206 can be associated with an individual or a business and/or include security features (e.g., be password protected). The internal database 206 can be any type of electronic record that includes information. The internal database 206 includes internal repositories 208. The internal repositories 208 are identified by hashes.

The internal catalog 210 includes search candidates 212. The search candidates 212 can include words, phrases, term, numeric values, alphanumeric values, characters, symbols, file extensions, file names, etc. The search candidates 212 are any candidates that may be of interest and/or indicative of sensitive data. For example, the terms "password," "secrets," "key," and "pwd" may be indicative of sensitive data.

The control circuit 214 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 214 is configured (for example, by using corresponding programming as will be well understood by those skilled in the art) to carry out one or more of the steps, actions, and/or functions described herein.

By one optional approach the control circuit 214 operably couples to a memory. The memory may be integral to the control circuit 214 or can be physically discrete (in whole or in part) from the control circuit 214 as desired. This memory can also be local with respect to the control circuit 214 (where, for example, both share a common circuit board, chassis, power supply, and/or housing) or can be partially or wholly remote with respect to the control circuit 214 (where, for example, the memory is physically located in another facility, metropolitan area, or even country as compared to the control circuit 214).

This memory can serve, for example, to non-transitorily store the computer instructions that, when executed by the control circuit 214, cause the control circuit 214 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 214 performs the steps necessary to determine if sensitive data has been exposed externally. As previously discussed, in some embodiments, the control circuit 214 can utilize a two-pronged approach. In the two-pronged approach, the control circuit generates a subject group of repositories based on two types of search criterion. The first search is a content search. The content search is based on the search candidates 212. At a high level, the control circuit searches the external database 202 for external repositories 204 that include one or more of the search candidates 212. If an external repository 204 includes one or more of the search candidates 212, it may include sensitive data. In some embodiments, the content search can also include a search for code that stands out from other code, such as high entropy strings ours other abnormal textual patterns. The second search is a hash search. The hash search is based on the hashes associated with the internal repositories 208. At a high level, the goal of the hash search is to identify any of the external repositories 204 that share a hash with one of the internal repositories 208. As previously discussed, because the hashes are based on the content of the repositories, if one of the hashes for the external repositories 204 matches one of the hashes of the internal repositories 208, it is likely that at least some portion of the internal repository 208 and the external repository 204 are common.

The results of these searches (i.e., content search results and hash search results) comprise a list of repositories that may include sensitive data. In some embodiments, this list can be further narrowed by eliminating ones of the repositories that need not be analyzed. For example, if a repository has already been analyzed and deemed not to include sensitive data, it is not necessary to again analyze that repository. In some embodiments, the system may store indications of repositories previously analyzed. Additionally, the system can store information relating to the modification of repositories, such as timing information. In such embodiments, if a repository has already been analyzed and deemed not to include sensitive data, the repository won't need to be analyzed unless it has been modified since the last analysis. Accordingly, in such embodiments, the control circuit 214 can discard any of the repositories that have not been modified since they were last analyzed. The list of repositories after those not needing be analyzed are discarded comprise a subject group of repositories.

Once the subject group of repositories has been complied, an analysis as to the likelihood that each repository includes sensitive data is performed. In some embodiments, the control circuit 214 analyzes each of the repository based on a list of expressions. The control circuit 214 uses the expressions to search for patterns in the repository. Based on the occurrence, or lack of occurrence, of the expressions, the control circuit generates a confidence score for each repository. The confidence score indicates the likelihood that a repository includes sensitive data. For example, the confidence score may indicate that the occurrence of an expression likely caused a false positive, or that the occurrence of an expression likely represents that sensitive data has been exposed. As previously discussed, the confidence score can dictate the type of notification transmitted.

Figure 3:
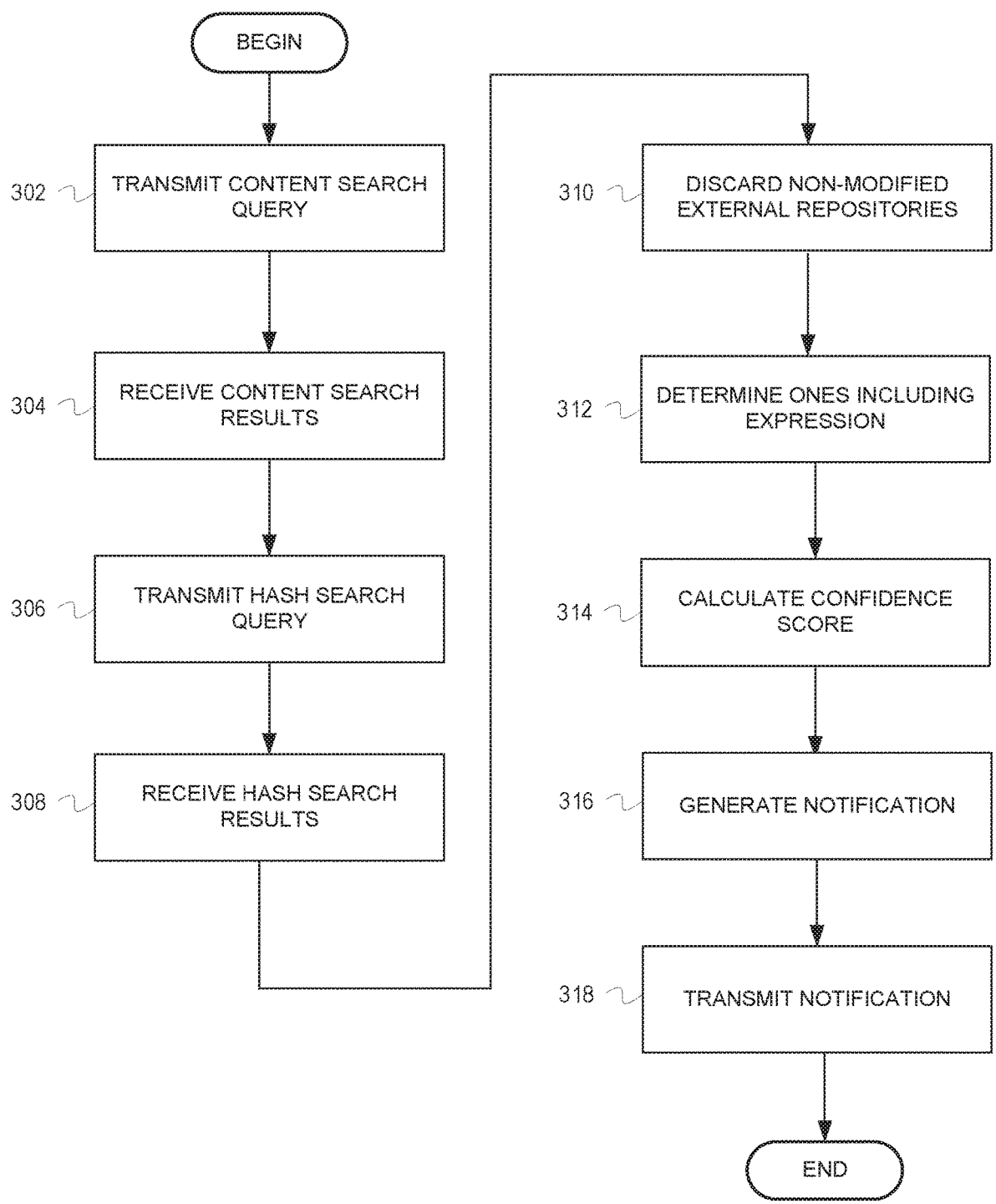
FIG. 3 is a flow chart depicting example operations for determining if sensitive data has been exposed externally, according to some embodiments.

While the discussion of FIG. 2 provides additional detail regarding a system for determining if sensitive data has been exposed, the discussion of FIG. 3 provides a discussion of example operations for such a system.

FIG. 3 is a flow chart depicting example operations for determining if sensitive data has been exposed externally, according to some embodiments. The flow begins at block 302.

At block 302, a content search query is transmitted. For example, a control circuit can transmit the content search query to an external database. The content search query is based on search candidates. The search candidates can be any types of words, phrases, characters, etc. of interest. The flow continues at block 304.

At block 304, content search results are received. For example, the control circuit can receive the content search results from the external database. The content search results include external repositories that satisfy the content search query (i.e., include any of the search candidates included in the content search query). The flow continues at block 306.

At block 306, a hash search query is transmitted. For example, the control circuit can transmit the hash search query to the external repository. The hash search query includes hashes associated with internal repositories. The flow continues at block 308.

At block 308, hash search results are received. For example, the hash search results can be received by the control circuit from the external database. The hash search results include external repositories having hashes that match the hashes associated with the internal repositories. The flow continues at block 310.

At block 310, non-modified external repositories are discarded. For example, the control circuit can discard the non-modified external repositories. That is, the control circuit discards any of the external repositories that have not been modified since they were last analyzed. In some embodiments, a record of analyzed external repositories is kept. The control circuit can access this record to determine if an external repository has already been analyzed. If the external repository has already been analyzed and has not been modified since it was last analyzed, the control circuit can discard the external repository so that it is not analyzed again. Such discarding of already-analyzed external repositories can increase the speed and/or efficiency with which the system operates. The external repositories that remain (i.e., that are not discarded) comprise a subject group of repositories. The flow continues at block 312.

At block 312, ones of the subject group of repositories including expressions are deterrminized. For example, the control circuit can determine which repositories of the subject group of repositories includes an expression. This determination can be performed based on a list of expressions. The list of expressions can include any desired expressions, and preferentially, include expressions that may be indicative of the inclusion of sensitive data. The flow continues at block 314.

At block 314, confidence scores are calculated. For example, the control circuit can calculate confidence scores. The control circuit calculates confidence scores for each of the repositories in the subject group of repositories. The confidence scores are indicative of how likely it is that the repositories include sensitive data. The confidence scores can be based on any desired scale (e.g., 0-100, 1-10, five-star scale, multi-level (e.g., low likelihood, medium likelihood, high likelihood), etc.). The flow continues at block 316.

At block 316, a notification is generated. For example, the control circuit can generate the notification. The notification is designed to notify a user that an external repository has been found that may include sensitive data. The notifications can have different types. For example, the notifications can have different transmission methods and/or different priority levels. For example, the type of a notification can be "immediate analysis" and be transmitted as a high priority email and be of a high priority type for a repository having a high confidence score. As a second example, a repository having a low confidence score may have a notification type of "standard analysis," in which the only notification of the repository is that it has been added to a queue for further analysis. As a third example, a notification type of "prioritized analysis" for a repository having an intermediate confidence score. The notification can include one or more of an indication of the type of the notification, a hash associated with a repository for analysis, a time the notification was generated, timestamp information for the repository for analysis, and a location of the repository for analysis. The flow continues at block 318.

At block 318, the notification is transmitted. For example, the control circuit can transmit the notification. In some embodiments, the transmission of the notification is based on the type of the notification. For example, an "immediate review" notification may be transmitted via multiple transmission technologies (e.g., email and text message), whereas a lower priority notification may be transmitted via a single transmission technology or simply included in a queue of repositories for review.

In some embodiments, an apparatus and a corresponding method performed by the apparatus comprises transmitting, by a control circuit to an external database, a content search query, wherein the content search query is based on search candidates, wherein the search candidates are included in an internal catalog, wherein the external database includes a plurality of external repositories, and wherein each of the external repositories is identified by a hash, receiving, by the control circuit from the external database, content search results, wherein the content search results includes ones of the plurality of external repositories that satisfy the content search query, transmitting, by the control circuit to the external database, a hash search query, wherein the hash search query includes hashes associated with ones of the internal repositories, receiving, by the control circuit from the external database, hash search results, wherein the hash search results include ones of the plurality of external repositories having hashes that match the hashes associated with the ones of the internal repositories, discarding, by the control circuit from the hash search results, any of the ones of the external repositories that have not been modified since last analyzed, wherein the content search results and remaining external repositories comprise a subject group of repositories, determining, based on a list of expressions, which repositories of the subject group of repositories include an expression from the list of expressions, calculating, for each repository of the subject group of repositories that includes an expression from the list of expressions, a confidence score, generating, for each repository in the subject group of repositories that includes an expression from the list of expressions, a notification, wherein a type of the notification is based on the confidence score, and transmitting, based on the type of the notification, the notification.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A system for determining if sensitive data has been exposed externally in order to send notification, the system comprising:
  an external database, wherein the external database includes a plurality of external repositories, wherein each of the plurality of external repositories is identified by a hash;
  an internal database, wherein the internal database includes a plurality of internal repositories, wherein each of the plurality of internal repositories is identified by a hash;
  an internal catalog, wherein the internal catalog includes search candidates, wherein one or more of the search candidates are indicative of the sensitive data; and
  a control circuit, the control circuit communicatively coupled to the external database, the internal database, and the internal catalog, the control circuit configured to:
    transmit, to the external database, a content search query, wherein the content search query is based on the search candidates;
    receive, from the external database, content search results, wherein the content search results include ones of the plurality of external repositories that satisfy the content search query;

transmit, to the external database, a hash search query, wherein the hash search query includes hashes associated with ones of the plurality of internal repositories, wherein the plurality of internal repositories comprise the sensitive data;

receive, from the external database, hash search results, wherein the hash search results include ones of the plurality of external repositories having hashes that match the hashes associated with the ones of the plurality of internal repositories;

determine, based on a list of expressions, which repositories of a subject group of repositories includes an expression from the list of expressions, wherein the subject group of repositories comprises the content search results and the hash search results;

generate, for each repository of the subject group of repositories that include the expression from the list of expressions, the notification; and transmit the notification, wherein one or more in the list of expressions are indicative of inclusion of the sensitive data.

2. The system of claim 1, wherein a type of the notification is based on a threshold and a confidence score.

3. The system of claim 2, wherein the control circuit is further configured to:
determine that the confidence score exceeds the threshold, wherein the type of the notification is immediate analysis.

4. The system of claim 3, wherein the control circuit transmits the notification to an incident response team.

5. The system of claim 2, wherein the control circuit is further configured to:
determine that the confidence score is below the threshold but exceeds a second threshold, wherein the type of the notification is prioritized analysis.

6. The system of claim 5, wherein the control circuit is further configured to:
flag a repository associated with the notification having the type of notification being prioritized analysis; and
add, to a queue, the repository associated with the notification having the type of notification being the prioritized analysis.

7. The system of claim 2, wherein the control circuit is further configured to:
determine that the confidence score is below the threshold, and wherein the type of the notification is standard analysis; and
add, to a queue, a repository associated with the notification having the type of notification being the standard analysis.

8. The system of claim 1, wherein the notification is an email.

9. The system of claim 1, wherein in the notification includes one or more of an indication of a type of the notification, a hash associated with a repository for analysis, a time the notification was generated, timestamp information for the repository for analysis, and a location of the repository for analysis.

10. The system of claim 1, wherein the hash search results do not include all of the plurality of external repositories.

11. A method for determining if sensitive data has been exposed externally in order to send notification, the method comprising:
transmitting, by a control circuit to an external database, a content search query, wherein the content search query is based on search candidates, wherein the search candidates are included in an internal catalog, wherein one or more of the search candidates are indicative of the sensitive data, wherein the external database includes a plurality of external repositories, and wherein each of the plurality of external repositories is identified by a hash;

receiving, by the control circuit from the external database, content search results, wherein the content search results include ones of the plurality of external repositories that satisfy the content search query;

transmitting, by the control circuit to the external database, a hash search query, wherein the hash search query includes hashes associated with ones of the internal repositories, wherein the plurality of internal repositories comprise the sensitive data;

receiving, by the control circuit from the external database, hash search results, wherein the hash search results include ones of the plurality of external repositories having hashes that match the hashes associated with the ones of the internal repositories;

determining, based on a list of expressions, which repositories of a subject group of repositories include an expression from the list of expressions, wherein the subject group of repositories comprises the content search results and the hash search results;

generating, for each repository in the subject group of repositories that includes the expression from the list of expressions, the notification; and transmitting the notification, wherein one or more in the list of expressions are indicative of inclusion of the sensitive data.

12. The method of claim 11, wherein a type of the notification is based on a threshold and a confidence score.

13. The method of claim 12, further comprising:
determining, by the control circuit, that the confidence score exceeds the threshold, wherein the type of the notification is immediate analysis.

14. The method of claim 13, wherein the notification is transmitted to an incident response team.

15. The method of claim 12, further comprising:
determining, by the control circuit, that the confidence score is below the threshold but exceeds a second threshold, wherein the type of the notification is prioritized analysis.

16. The method of claim 15, further comprising:
flagging, by the control circuit, a repository associated with the notification having the type of notification being the prioritized analysis; and
adding, by the control circuit to a queue, the repository associated with the notification having the type of notification being the prioritized analysis.

17. The method of claim 12, further comprising:
determining, by the control circuit, that the confidence score is below the threshold, and wherein the type of the notification is standard analysis; and
adding, by the control circuit to a queue, a repository associated with the notification having the type of notification being the standard analysis.

18. The method of claim 11, wherein the notification is an email.

19. The method of claim 11, wherein in the notification includes one or more of an indication of a type of the notification, a hash associated with a repository for analysis, a time the notification was generated, timestamp information for the repository for analysis, and a location of the repository for analysis.

20. The method of claim 11, wherein the hash search results do not include all of the plurality of external repositories.

\* \* \* \* \*